(12) United States Patent
Sokoll

(10) Patent No.: US 7,753,823 B2
(45) Date of Patent: Jul. 13, 2010

(54) SYSTEMS AND METHODS FOR BRAKE REGULATION OF MOTOR VEHICLES

(75) Inventor: Guenther Sokoll, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 542 days.

(21) Appl. No.: 11/699,491

(22) Filed: Jan. 30, 2007

(65) Prior Publication Data

US 2007/0179020 A1    Aug. 2, 2007

(30) Foreign Application Priority Data

Jan. 31, 2006    (DE) .................. 10 2006 004 258

(51) Int. Cl.
  *B60W 10/04*  (2006.01)
  *B60W 10/18*  (2006.01)
  *B60T 8/32*  (2006.01)

(52) U.S. Cl. ................... 477/182; 477/195; 303/191

(58) Field of Classification Search .......... 477/182, 477/194, 195; 303/191; 188/353
See application file for complete search history.

(56) References Cited

U.S. PATENT DOCUMENTS

| | | | |
|---|---|---|---|
| 5,979,619 A | 11/1999 | Rump | |
| 6,315,372 B1 | 11/2001 | Kroeger et al. | |
| 6,439,675 B1 | 8/2002 | Zechmann et al. | |
| 6,814,414 B1 | 11/2004 | Schmitt et al. | |
| 7,231,994 B2 * | 6/2007 | Buglione et al. | 180/65.31 |
| 2003/0033073 A1 * | 2/2003 | Kichima et al. | 701/96 |
| 2006/0079377 A1 * | 4/2006 | Steen et al. | 477/186 |
| 2008/0026913 A1 * | 1/2008 | Nakamoto et al. | 477/184 |

FOREIGN PATENT DOCUMENTS

| | | |
|---|---|---|
| DE | 196 11 359 C 1 | 8/1997 |
| DE | 199 41 482 A 1 | 4/2000 |
| DE | 198 48 448 A 1 | 5/2000 |
| DE | 199 50 034 A 1 | 4/2001 |
| DE | 199 50 162 A 1 | 5/2001 |
| DE | 101 51 846 A 1 | 5/2002 |

OTHER PUBLICATIONS

German Search Report dated Aug. 29, 2006 with English translation of pertinent portions (Nine (9) pages).

* cited by examiner

*Primary Examiner*—Tisha D Lewis
(74) *Attorney, Agent, or Firm*—Crowell & Moring LLP

(57) ABSTRACT

A brake regulating system for motor vehicles is provided having an electronic control unit, by which an automatic parking brake function is activatable at a standstill of the motor vehicle, whose deactivation is performed as a function of the instantaneous drive torque, is implemented in such a way that in the event of activated parking brake function, a deactivation of the parking brake function may be suppressed if, on the basis of a function executed at a standstill of the motor vehicle, an automatic increase of the drive torque which does not result from a starting command of the driver is necessary.

5 Claims, 1 Drawing Sheet

SYSTEMS AND METHODS FOR BRAKE REGULATION OF MOTOR VEHICLES

BACKGROUND AND SUMMARY OF THE INVENTION

This application claims the priority of German Application No. 10 2006 004 258.1, filed Jan. 31, 2006, the disclosure of which is expressly incorporated by reference herein.

The present invention relates to brake regulating systems and methods for motor vehicles having an electronic control unit, by which an automatic parking brake function is activatable at a standstill of the motor vehicle, deactivation of which is performed as a function of the instantaneous drive torque.

Methods and systems which are to be used for preventing vehicles from rolling away—particularly, but not necessarily, on slopes—are known from various patent applications and patent specifications, for example, from DE 199 50 034 A1 (having U.S. counterpart U.S. Pat. No. 6,439,675 B1), DE 196 11 359 C1 (having U.S. counterpart U.S. Pat. No. 5,979,619); DE 199 50 162 B4; DE 198 48 448 C2 (having U.S. counterpart U.S. Pat. No. 6,315,372 B1); DE 101 51 846 B4; DE 199 41 482 A1 (having U.S. counterpart U.S. Pat. No. 6,814,414 B1), and more. Usually, in at least one operating state upon actuating a brake pedal or due to another actuating element, braking force is maintained or actively built up on at least one wheel of the vehicle dependently or independently of the dimension of the pedal actuation or another actuating element. Various entry and/or trigger conditions are provided jointly, or alternatively, for the activation and deactivation of the function.

These methods and devices are known, for example, under the names starting assistant, hill assistant, hill holder, or automatic hold. In summary, these methods are referred to in the following as automatic parking brake functions. All of these automatic parking brake functions share the feature, for example, of a hydraulic, mechanical, electrohydraulic, electromechanical, pneumatic, or electronically controllable brake system. By using the controllable braking system, the vehicle is stopped and is prevented from rolling. Methods are also known in which rolling of the vehicle is prevented via the transmission (in particular, such as automatic transmissions). In all of these functions, for example, the function is activated by actuating the brake pedal or the hand brake, or via switching elements connected thereto, and/or also other actuating elements (such as switches, buttons, etc.). Deactivation is performed via the same or also other measures (such as gas pedal setting, clutch signal, drive torque signals of the engine, etc., and also after passage of a defined retention time).

Important further required measures, control signals, or switching devices for implementing the functions are, for example, usually one or more velocity signals for detecting the vehicle standstill, mechanical, pneumatic, or hydraulic actuators (electrohydraulic, electropneumatic, or electrical actuators are also contemplated, in principle) in the wheel brakes and/or in the supply lines to the wheel brakes, via which the brake action may be built up and reduced, and/or at least temporarily maintained (e.g., control/regulating valves integrated in the form of an existing control or regulating unit, such as ABS, ASC/ASR, DSC/ESP/EHB systems), possibly also longitudinal acceleration or inclination sensors. By using these measures, the roadway longitudinal inclination may be ascertained and the braking force necessary for a secure standstill of the vehicle and the starting torque required for the roadway inclination may be determined and one or more pressure sensors, with the aid of which the brake pressure and/or the applied braking torque on the wheel brakes(s), may be ascertained.

An aspect of the present invention is to disengage the braking torque as necessary, and precisely, in a targeted manner at a sufficiently high starting torque so that the vehicle does not roll in an undesired way prematurely against the desired travel direction, thus possibly causing accident situations. Additionally, the vehicle does not have to start up against the brake retaining force and thus reductions in comfort, which may otherwise arise due to too long a braking force retention (caused by a requested starting torque, which is too high) can be minimized.

The present invention thus provides a brake regulating system for motor vehicles having an electronic control unit, by which an automatic parking brake function is activatable at a standstill of the motor vehicle, deactivation of which is performed as a function of the instantaneous drive torque. In the event of an activated parking brake function, a deactivation of the parking brake function may be suppressed if, on the basis of a function executed at a standstill of the motor vehicle, an automatic increase of the drive torque, which does not result from a starting command of the driver, is necessary. Advantageous refinements of the present invention are described and claimed herein.

Other objects, advantages and novel features of the present invention will become apparent from the following detailed description of the invention when considered in conjunction with the accompanying drawings.

DETAILED DESCRIPTION OF THE DRAWING

Figure 1:
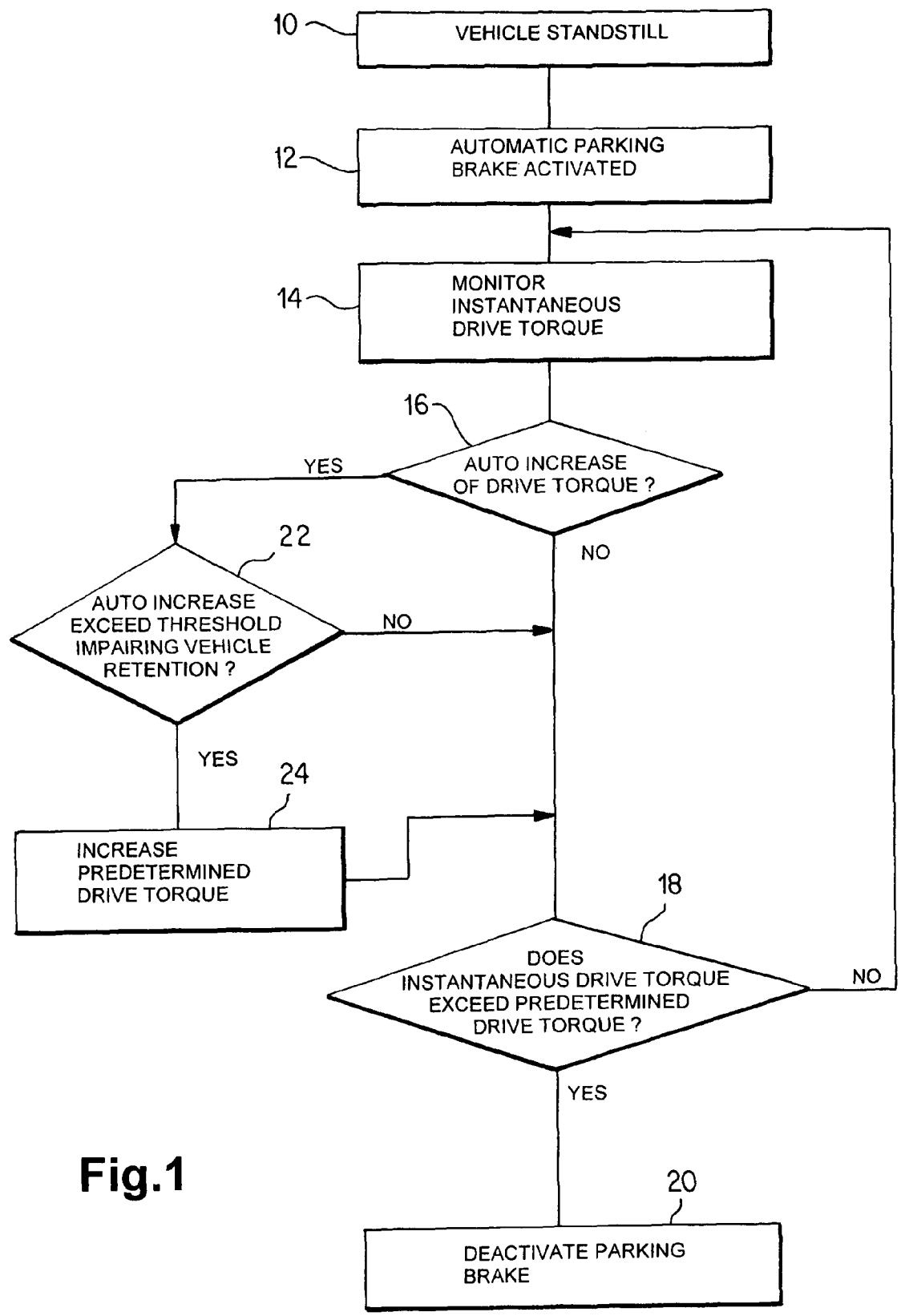
FIG. 1 is a flow chart illustrating the method for brake regulation of a motor vehicle according to the present invention.

The present invention is based on the following recognitions:

In the known methods and devices, under specific conditions with an activated parking brake function (retention phase of a hill holding function, for example), the problem may arise that due to an "automatic" increase of the engine torque (i.e., not predefined directly by the driver via accelerator pedal preset), or more generally the drive torque, a premature startup command is detected and the braking torque (and/or braking force or brake pressure) is then automatically reduced by the system. The vehicle is thus no longer sufficiently fixed on the slope and may start to roll too early unintentionally, which may, at a minimum, result in a reduction in comfort.

The reasons and/or triggers for an "automatic" drive torque increase—which is usually only temporarily active—may be the following, for example. In particular, due to actuation of the steering (steering movements) by the driver, possibly also due to a steering system (e.g., AFS, EPS), but also, for example, due to the air-conditioning system (start up/shut down of air-conditioning compressor), the start up of the (electric) motor fan, the start up and shut down of other mechanical, electromechanical, electrical, pneumatic, or hydraulic consumers in the vehicle (e.g., transmission torque changes by connecting/disconnecting converter lockup clutches, etc.), i.e., in general due to internal vehicle consumers (loads) and systems and/or components which require a consumption torque (e.g., friction torque, drag torque) from the drive engine, the engine control/regulation and/or its idle regulator must first be settled out. Typically, brief oscillations and/or exaggerations of the delivered drive torque arise due to the settling procedure of the engine controller/regulator, which may then finally result in an erroneous detection of a starting command.

The required setpoint drive torque (as a base drive torque condition), which is usually at least variable as a function of slope, may accordingly be fixed higher in general to deactivate the parking brake function by corresponding adaptation/application of the automatic parking brake function and/or oscillating influences may be damped by chronological filtering of the drive torque signal, so that automatic drive torque changes as described above during the retention phase do not result in the erroneous detection of the starting command described. However, this in turn has the disadvantage that in the event of a "real" starting command via accelerator pedal preset, a braking torque disengagement of the automatic parking brake function, which is significantly too late, occurs. The impression will thus always arise, when starting, of at least briefly starting against the brakes, which would be connected to significant comfort disadvantages and quality complaints.

A general case differentiation in an automatic parking brake function between the above-mentioned undesired drive torque increases and the drive torque increase as a result of "starting command via accelerator pedal" is generally forbidden since the automatic parking brake function is frequently defined in such a way that a comfortable start (i.e., the timely disengagement of the braking torque) without rolling against the desired travel direction must also be possible solely by applying the idle torque (and/or creep torque), without the driver actuating the gas pedal.

In order to suppress interfering influences due to drive torque oscillations during the retention phase of the system, it is necessary to detect these influences individually or as a whole and to correct the drive torque observed for the automatic parking brake function (e.g., hill holder function) accordingly.

The present invention provides a brake regulating system and method for motor vehicles having an electronic control unit, by which an automatic parking brake function is activatable in a standstill mode of the motor vehicle (retention phase), whose deactivation is performed as a function of the instantaneous drive torque, is implemented in such a way that when the parking brake function is activated, a deactivation of the parking brake function may be suppressed if, because of a function executed at a standstill of the motor vehicle, an automatic increase of the drive torque, which does not result from a starting command of the driver, is necessary.

Referring to FIG. 1, a flow chart illustrates an embodiment of the present invention, wherein when a vehicle is at standstill or nearly standstill—and if necessary further conditions are fulfilled (e.g. brake pedal activated)—(step 10) and the automatic parking brake function is activated (step 12), the instantaneous drive torque is monitored (step 14). The method determines whether there is an automatic increase of drive torque (step 16). If not, then the method determines whether the instantaneous drive torque exceeds a predetermined drive torque (step 18). If not, then the method continues to monitor the instantaneous drive torque (step 14). However, if there is an automatic increase of drive torque (step 16), then the method determines whether the automatic increase of drive torque exceeds a threshold that impairs vehicle retention (step 22). If not, then the process returns to the step of determining whether the instantaneous drive torque exceeds a predetermined drive torque (step 18). However, if the automatic increase in drive torque does exceed the threshold impairing the vehicle retention (step 22), then the method operates to increase the predetermined drive torque (step 24), at which point the method continues to determine whether the instantaneous drive torque exceeds the predetermined drive torque (step 18). Should the instantaneous drive torque exceed the predetermined drive torque (step 18), then the automatic parking brake function is deactivated (step 20).

Via information which is applied to a data bus (e.g., CAN bus) connected to the control unit, the value or the gradient may be provided to the control unit via this automatic drive torque increase itself. Additionally or alternatively, state changes of internal vehicle consumers, which may cause an increase of the drive torque, may be monitored to detect an automatic increase of the drive torque.

A corresponding absolute value, relative value, and/or a corresponding gradient value of the drive torque increase may be concluded as a function of a state change of a consumer. As a function of this absolute value and/or relative value and/or as a function of this gradient value of the drive torque increase, a base drive torque condition, which must be fulfilled to deactivate the automatic parking brake function, may be the corrected. The base drive torque condition may be the exceeding of a first absolute and/or relative threshold value and/or of a first gradient threshold value.

The braking torque required for activating the automatic parking brake function for the retention phase may be compared to the drive torque. The braking torque may be increased if the automatic increase of the drive torque exceeds a defined second absolute and/or relative threshold value and/or a defined second gradient threshold value in such a way that secure retention of the motor vehicle at a standstill may not be ensured.

An exemplary embodiment is described on the basis of a correction of the base drive torque condition during an activated parking brake function (e.g., "hill holder retention phase") in the event of steering actions.

In the event of steering movements (=state changes of the consumer steering system) at a standstill of the vehicle (e.g., during parking actions), in situations in which the hill holder function is active—i.e., the vehicle is at least temporarily retained by at least one or more vehicle brake(s) via applied braking torque—, drive torque changes are induced directly above all in hydraulic steering systems by steering torque changes.

The base drive torque condition may be adapted, for example, in such a way that during the hill holder retention phase, a correction as a function of the above-mentioned variables is performed continuously:

1. as a function of the steering angular velocity (gradient of the steering angle) and/or steering wheel angular velocity and/or if a defined threshold is exceeded, and/or
2. as a function of the steering angle and/or steering wheel angle and/or exceeding/falling below a defined threshold, and/or
3. as a function of an available signal, which describes the steering movements and/or steering torque sufficiently precisely in another way (e.g., steering pump pressure and/or pressure in the hydraulic steering lines; steering torque which is output by signal transmission (e.g., CAN) from a steering control unit (e.g., AFS, EPS) and is available to the hill holder functionality), and/or upon exceeding/falling below a defined threshold, and/or
4. as a function of an activation/deactivation signal (e.g., CAN activation message, activation bit, switching signal, etc.), which signals a steering movement.

A correction may, for example, be performed using the above-mentioned variables of steering angle and/or steering angular velocity or also steering pressure level in that a constant (torque) offset derived therefrom is added to or subtracted from the drive torque value relevant for the hill holder function as a fixed value and/or a variable value from a mathematical-functional dependence thereon (e.g., proportional connection via characteristic line, linear or curved). Instead, a multiplicative correction or correction according to another defined functional dependence would also be possible.

In the case of a torque signal which is already available (e.g., steering torque request via CAN from a steering control unit), this may also be used itself for correcting the drive torque evaluated in the hill holder.

Corrections of the hill holder drive torque corresponding to the exemplary embodiment may also be performed analogously for further possible influencing variables.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for brake regulation of motor vehicles having an electronic control unit, by which an automatic parking brake function is activatable at a standstill of the motor vehicle, whose deactivation is performed as a function of an instantaneous drive torque, the method comprising the acts of:
   in the event of an activated parking brake function, suppressing a deactivation of the parking brake function in response to a function executed at a standstill of the motor vehicle that makes necessary an automatic increase of the drive torque which does not result from a starting command of a driver,
   wherein at least one of a corresponding absolute value, relative value, and a corresponding gradient value, of the drive torque increase is concluded as a function of the state change of a consumer, and
   correcting a base drive torque condition for deactivating the automatic parking brake function as a function of at least one of said absolute value, said relative value, and as a function of said gradient value, of the drive torque increase.

2. A method for brake regulation of motor vehicles having an electronic control unit, by which an automatic parking brake function is activatable at a standstill of the motor vehicle, whose deactivation is performed as a function of an instantaneous drive torque, the method comprising the acts of:
   in the event of an activated parking brake function, suppressing a deactivation of the parking brake function in response to a function executed at a standstill of the motor vehicle that makes necessary an automatic increase of the drive torque which does not result from a starting command of a driver;
   monitoring state changes of internal vehicle consumers to detect an automatic increase of the drive torque, wherein at least one of a corresponding absolute value, relative value, and a corresponding gradient value, of the drive torque increase is concluded as a function of the state change of a consumer; and
   correcting a base drive torque condition for deactivating the automatic parking brake function as a function of at least one of said absolute value, said relative value, and as a function of said gradient value, of the drive torque increase.

3. The brake regulating method according to claim 2, wherein a brake torque required for activating the automatic parking brake function for a retention phase is compared to the drive torque, and the brake torque is increased if the automatic increase of the drive torque exceeds at least one of a defined absolute threshold value, a relative threshold value, and a defined gradient threshold value such that secure retention of the motor vehicle at a standstill may not be ensured.

4. The brake regulating method according to claim 1, wherein a brake torque required for activating the automatic parking brake function for a retention phase is compared to the drive torque, and the brake torque is increased if the automatic increase of the drive torque exceeds at least one of a defined absolute threshold value, a relative threshold value, and a defined gradient threshold value such that secure retention of the motor vehicle at a standstill may not be ensured.

5. A brake regulation system for a motor vehicle, comprising:
   means for activating an automatic parking brake function at a standstill of the motor vehicle;
   means for deactivating the automatic parking brake function as a function of an instantaneous drive torque;
   means for suppressing the deactivation of the parking brake function based on a function executed at the standstill of the motor vehicle when an automatic increase of the drive torque is not a result of a starting command by a driver of the vehicle, and
   a control unit that compares a brake torque required for activating the automatic parking brake function for a retention phase to the drive torque, and that increases the brake torque in response to an automatic increase of the drive torque exceeding at least one of a defined absolute threshold value, a relative threshold value, and a defined gradient threshold value, such that secure retention of the motor vehicle at a standstill may not be ensured.

* * * * *